United States Patent
Kobayashi et al.

(10) Patent No.: US 8,047,832 B2
(45) Date of Patent: Nov. 1, 2011

(54) INJECTION/STRETCH BLOW MOLDING MACHINE

(75) Inventors: Sentaro Kobayashi, Nagano-ken (JP);
Naohide Matsuzaka, Nagano-ken (JP)

(73) Assignee: A.K. Technical Laboratory, Inc., Hanishina-gun, Nagano-ken (JP)

( * ) Notice: Subject to any disclaimer, the term of this patent is extended or adjusted under 35 U.S.C. 154(b) by 417 days.

(21) Appl. No.: 12/302,387

(22) PCT Filed: May 29, 2007

(86) PCT No.: PCT/JP2007/061254
§ 371 (c)(1),
(2), (4) Date: Jan. 13, 2009

(87) PCT Pub. No.: WO2007/139226
PCT Pub. Date: Jun. 12, 2007

(65) Prior Publication Data
US 2009/0274789 A1    Nov. 5, 2009

(30) Foreign Application Priority Data

May 30, 2006 (JP) ................................. 2006-150137

(51) Int. Cl.
B29C 49/06 (2006.01)
B29C 49/56 (2006.01)
(52) U.S. Cl. ......... 425/190; 425/529; 425/533; 425/541
(58) Field of Classification Search .................. 425/182, 425/190, 529, 533, 541
See application file for complete search history.

(56) References Cited

U.S. PATENT DOCUMENTS

| 4,422,843 A | * | 12/1983 | Aoki | 425/525 |
| 4,648,824 A | * | 3/1987 | Aoki | 425/150 |
| 5,468,443 A | * | 11/1995 | Takada et al. | 264/537 |
| 2004/0105912 A1 | | 6/2004 | Koda | |
| 2004/0219254 A1 | | 11/2004 | Kobayashi et al. | |

FOREIGN PATENT DOCUMENTS

| JP | 52-82967 | | 7/1977 |
| JP | 53-22096 B | | 7/1978 |
| JP | 6305002 | | 11/1994 |
| JP | 2002011777 A | * | 1/2002 |
| JP | 2005007797 A | * | 1/2005 |

* cited by examiner

*Primary Examiner* — Robert B Davis
(74) *Attorney, Agent, or Firm* — Weingarten, Schurgin, Gagnebin & Lebovici LLP

(57) ABSTRACT

An injection/stretch blow mold clamping mechanism comprises mold clamping shafts erected vertically movably on both sides of an injection molding operation section and extending through the lower base platen and upper base platen, hydraulic mold clamping means connected respectively to lower ends positioned within a bed of the clamping shafts, a mold clamping platen having core molds attached thereto and being fitted on the mold clamping shafts, the clamping platen being installed vertically movably between the upper base platen and a top platen, a pair of mold air cylinders connecting on both sides thereof the upper base platen and the clamping platen with each other and causing the clamping platen to move vertically with respect to the upper base platen, a mold clamping rod connected to the mold clamping platen through the top platen, and a pair of clamp members disposed on an upper surface of the top platen.

8 Claims, 12 Drawing Sheets

INJECTION/STRETCH BLOW MOLDING MACHINE

FIELD OF THE INVENTION

The present invention relates to an injection/stretch blow molding machine which performs both injection molding of a preform and stretch blow molding of a hollow molded product such as, for example, a bottle in a continuous manner within single machine by intermittent rotation of a transfer platen disposed above a machine base.

DESCRIPTION OF THE BACKGROUND ART

In this type of a molding machine, both injection unit and injection/stretch blow unit are installed on single bed. The injection/stretch blow unit is horizontally provided with a base platen on which installed are an injection mold clamping mechanism and a stretch blowing mechanism, the base platen being positioned above a lower base platen installed on a bed. As examples of such an upper base platen, there are known a movable one supported vertically movably by a hydraulic lift cylinder as is disclosed in Japanese Patent Laid-Open Publication No. 2004-122440 and a stationary one as is disclosed in Japanese Patent Publication No. Sho53 (1978)-22096. In both types, however, the space between both base platens is utilized as a work space, a transfer platen is attached to the underside of the upper base platen horizontally so as to be rotatable intermittently, the positions at which neck molds for a preform provided on a lower surface of the transfer platen stop in order are set as an injection molding operation section, a stretch blow molding operation section, and a product take-out operation section, respectively, and an injection mold clamping mechanism, a stretch blowing mechanism, and a take-out mechanism, are installed therein. As the case may be, the number of such stop positions is increased to add a temperature adjustment operation section.

In the injection mold clamping mechanism, which is a vertical type, tie bars erected on both sides of the injection molding operation section are inserted through the upper base platen and an overlying mold clamping platen to support them, a mold clamping cylinder block is fixed to upper ends of the tie bars, and mold clamping rams are connected to the mold clamping platen. Both ends of the upper base platen and the mold clamping platen are connected together through hydraulic opening/closing cylinders to make the mold clamping platen movable vertically with respect to the upper base platen, thereby permitting opening and closing core molds attached to a lower surface of the mold clamping platen.

In such an injection mold clamping mechanism, since the mold clamping cylinder block is fixed to the upper ends of the tie bars, the height of the mechanism is larger than that of the ordinary vertical type mold clamping mechanism, and in a certain workshop the molding machine cannot be carried into the interior. Moreover, since all of mold opening, closing and clamping works are performed by hydraulic means, the amount of oil used in hydraulic circuits is very large. Besides, since hydraulic cylinders are located higher than the upper base platen, there is a fear of contamination caused by oil leakage and thus there is the problem that the adoption of the injection mold clamping mechanism is difficult for some application of the resulting molded product.

Further, since both injection blow molding unit and injection unit are installed on a common bed, a mold change or maintenance work for the injection mold clamping mechanism must be done at an unstable attitude and requires much time.

Additionally, since the injection mold in the injection molding operation section and the blow mold in the stretch blow molding operation section are positioned in the work space below the upper base platen, the upper base platen and the underlying transfer platen are intervened between them and the injection mold clamping mechanism, as well as the stretch blowing mechanism, installed on the upper base platen. Therefore, mold closing between injection and blow cores positioned above the upper base platen and the injection and blow molds positioned below the upper base platen are performed by insertion of the cores though insertion holes formed in both upper base platen and transfer platen. Thus, mold clamping is performed in a state where the upper base platen and the transfer platen are sandwiched. As a result, there acts a stronger mold clamping force than in the ordinary case where molds are clamped to each other directly. In view of this point there has been proposed such a construction as is disclosed in Japanese Patent Laid-Open Publication No. 2004-262052 wherein an elongated hole permitting insertion therein of a core joint plate is formed to make direct mold clamping possible.

Anyhow, since the upper base platen above the work space exists, it is impossible to combine and superimpose injection core molds or blow cores beforehand onto neck molds and a mold as one set and then insert this set together with a mold assembly into the work space sideways of the machine base. According to the conventional method for avoiding such an inconvenience, installation of the mold assembly and attachment of neck molds to the lower surface of the transfer platen in the working space are performed firstly, the injection core molds or blow cores attached to a joint plate is inserted into the mold through holes from above the upper base platen secondly, and after temporary mold closing, the joint plate is secured to a mold clamping platen or a movable platen in the stretch blowing mechanism. Since the mold is divided into upper part and lower part interposing the upper base platen as a boundary, the assembling work takes time. It takes much time also for positioning the mold and the cores. Thus, there has been a problem on working efficiency in mold replacement.

Accordingly, it is an object of the present invention to provide an injection/stretch blow molding machine which adopts connecting means using a clamp to make it possible to clamp an injection mold and injection cores below a lower base platen, thereby reducing the height of an injection mold clamping mechanism and hence solving the problem of increase in height caused by a mold clamping cylinder block, and, by the adoption of an air cylinder, can prevent contamination of molded products caused by oil leakage and also can improve the molding efficiency by using a minimum amount of oil required.

It is another object of the present invention to provide an injection/stretch blow molding machine wherein a bed is divided into a bed for an injection mold clamping mechanism and a bed for an injection unit, thereby ensuring a work space for a mold replacement work, etc., and an injection unit can be installed regardless of screw length.

It is a further object of the present invention to provide a new injection/stretch blow molding machine wherein recesses are formed in edge sides of an upper base platen and of a transfer platen so that injection core molds or blow cores attached to a mold clamping block or a joint plate can be inserted into a work space in a superimposed state on a mold together with neck molds, thereby making it possible to perform the work for assembling both upper part and lower part of the base platen and hence possible to shorten the mold assembling time and positioning time.

SUMMARY OF THE INVENTION

According to the present invention there is provided, in an injection/stretch blow molding machine comprising an injection/stretch blow unit and an injection unit, the injection/stretch blow unit including a lower base platen installed on a bed, an upper base platen supported vertically movably by a hydraulic lift cylinder, a space being formed between the lower base platen and the upper base platen and used as a work space, a transfer platen installed on an underside of the upper base platen so as to be rotatable intermittently, and a vertical injection mold clamping mechanism installed in an injection molding operation section, the injection molding operation section being defined at a stop position of neck molds provided on a lower surface of the transfer platen, the injection unit being installed on the bed toward the injection mold clamping mechanism, the injection/stretch blow molding machine improved in that the injection mold clamping mechanism comprising a pair of mold clamping shafts erected vertically movably on both sides of the injection molding operation section and extending through both the lower base platen and the upper base platen, upper end portions of the mold clamping shafts being connected together through a top platen, a plurality of hydraulic mold clamping means connected respectively to lower ends positioned within the bed of the mold clamping shafts, the mold clamping shafts being attached to an underside of the lower base platen, a mold clamping platen having, in the center of a lower surface thereof, a mold clamping block to which core molds are attached downwards, the mold clamping platen being fitted and supported at both end portions thereof on the mold clamping shafts and installed vertically movably between the upper base platen and the top platen, a pair of mold opening/closing cylinders connecting, on both sides thereof, the upper base platen and the mold clamping platen with each other and causing the mold clamping platen to move vertically with respect to the upper base platen, a mold clamping rod connected to the center of an upper surface of the mold clamping platen through a central opening of the top platen, and a pair of clamp members disposed on both sides of the opening in the upper surface of the top platen so as to be movable forward and backward, the clamp members being adapted to be engaged with the mold clamping rod by pneumatic clamp cylinders to connect the mold clamping platen and the mold clamping shafts with each other.

According to the above construction, all that is required is disposing hydraulic mold clamping means at the lower ends of the mold clamping shafts positioned within the bed and installing clamp members on the top platen which provides a connection between the upper ends of the mold clamping shafts. Therefore, it is possible to reduce the height of the mold clamping mechanism by an amount corresponding to the mold clamping cylinder block in comparison with the prior art. Besides, since the operation for opening and closing the mold clamping platen located higher than the upper base platen, as well as the operation for moving the clamp members forward and backward, can be performed pneumatically, there no longer is contamination caused by oil leakage at any portion located above the upper base platen and the opening/closing operation becomes higher in speed. Moreover, the stress acting on the portions of the upper base platen and the mold clamping platen where the mold opening/closing cylinders are mounted does not cause strain of both platens when the mold is closed, since the energy of the air cylinders is smaller than that of hydraulic cylinders. Further, in the case of an air cylinder, air purging is available, instead of returning air from a lower or an upper chamber to a tank at every actuation of the cylinder. Consequently, the configuration of an operation circuit is simplified and the operation speed becomes higher in comparison with the case of a hydraulic cylinder, thereby reducing the time required for mold opening and closing.

Since mold clamping means is provided with each molding clamping shaft, the associated mold clamping cylinder may be small-sized and the amount of oil required for mold clamping may be small, and thereby the required amount of oil is minimized. Consequently, it is possible to attain both stabilization of the oil temperature and efficient operation. Besides, by adopting a bidirectional pump for hydraulic control of each mold clamping means, it is possible to reduce the number of change-over valves and hence possible to reduce energy loss in hydraulic circuits.

Preferably, the upper base platen is provided with, on an upper surface thereof, a plurality of shock absorbers for bearing the mold clamping platen, and the mold clamping means each comprise a pair of front and rear hydraulic cylinders attached to the lower base platen on both sides of each of the mold clamping shafts, and joints for connecting rams of the hydraulic cylinders with a pressure bearing plate secured to a lower end of the shaft. Since shock absorbers for bearing the mold clamping platen are provided on the upper surface of the upper base platen, the mold closing operation with slowing down of the closing speed of the mold clamping platen can be performed pneumatically as is the case with hydraulic operation.

Preferably, the bed is fabricated dividedly into a bed for the injection/stretch blow unit and a bed for the injection unit, and both beds are placed and fixed onto a common base frame so as to ensure a predetermined work space. Since the bed is divided into a bed for the injection/stretch blow unit and a bed for the injection unit, and both beds can be placed and fixed onto a common base frame to complete the molding machine, even if the screw length of the injection unit adopted therein is different from each other, the injection unit can be installed together with its bed with respect to the injection/stretch blow unit by changing the length of the base frame. Thus, the work for assembling the molding machine is advantageously performed regardless of the screw length. Further, since a work space which permits mold replacement or inspection in standing posture is ensured between the injection/stretch blow unit and the injection unit, the work can be performed in comfortable position than in the conventional molding machine using a single bed in common, and thereby the time required for the work is reduced.

According to the present invention, further provided is, in an injection/stretch blow molding machine comprising an upper base platen installed horizontally above a bed, a space being formed between the upper base platen and the bed and used as a work space, a transfer platen installed rotatably on an underside of the upper base platen, a mold holding plate having neck molds and installed on a lower surface of the transfer platen so that the mold holding plate can be opened and closed, the mold holding plate being adapted to stop at positions defined as an injection molding operation section, a stretch blow molding operation section and a take-out operation section, and provided with various devices being arranged on the bed and on the upper base platen, the injection/stretch blow molding machine improved in that edge sides of the portions of the upper base platen corresponding to the operation sections and edge sides of the portions of the transfer platen to be stopped at the operation sections are each formed as a U-shaped recess of a size permitting insertion therein of a joint plate of injection cores or blow cores disposed on the upper base platen, and in each of the recesses formed in the transfer platen the mold holding plate spans a lower surface of the recess so as to cover both sides of the lower surface, thereby causing the neck molds to be positioned within the recess. Preferably, the upper base platen is fitted vertically movably at a peripheral edge portion of the platen on tie bars erected at plural positions on the bed and is provided with, in the center of an upper surface thereof, a drive motor for rotating the transfer platen intermittently, the drive motor having a drive shaft extending through the center of the upper base platen and being connected to the center of the transfer platen.

In this construction, since edge sides of the portions of the upper base platen corresponding to the operation sections and edge sides of the portions of the transfer platen to be stopped at the operation sections are each formed as a U-shaped recess of a size permitting insertion therein of a joint plate, the work for mounting injection core molds, blow cores and stretching rods onto the upper base platen can be performed by superimposing them together with the neck molds in a mold closed state onto an injection mold or a blow mold which is installed on the bed in the work space. Thus, the work for assembling the mold becomes easier than in the prior art in which the mold is divided into upper part and lower part interposing the upper base platen as a boundary, and thereby working efficiency on mold replacement is significantly improved.

DETAILED DESCRIPTION OF THE INVENTION

Figure 1:
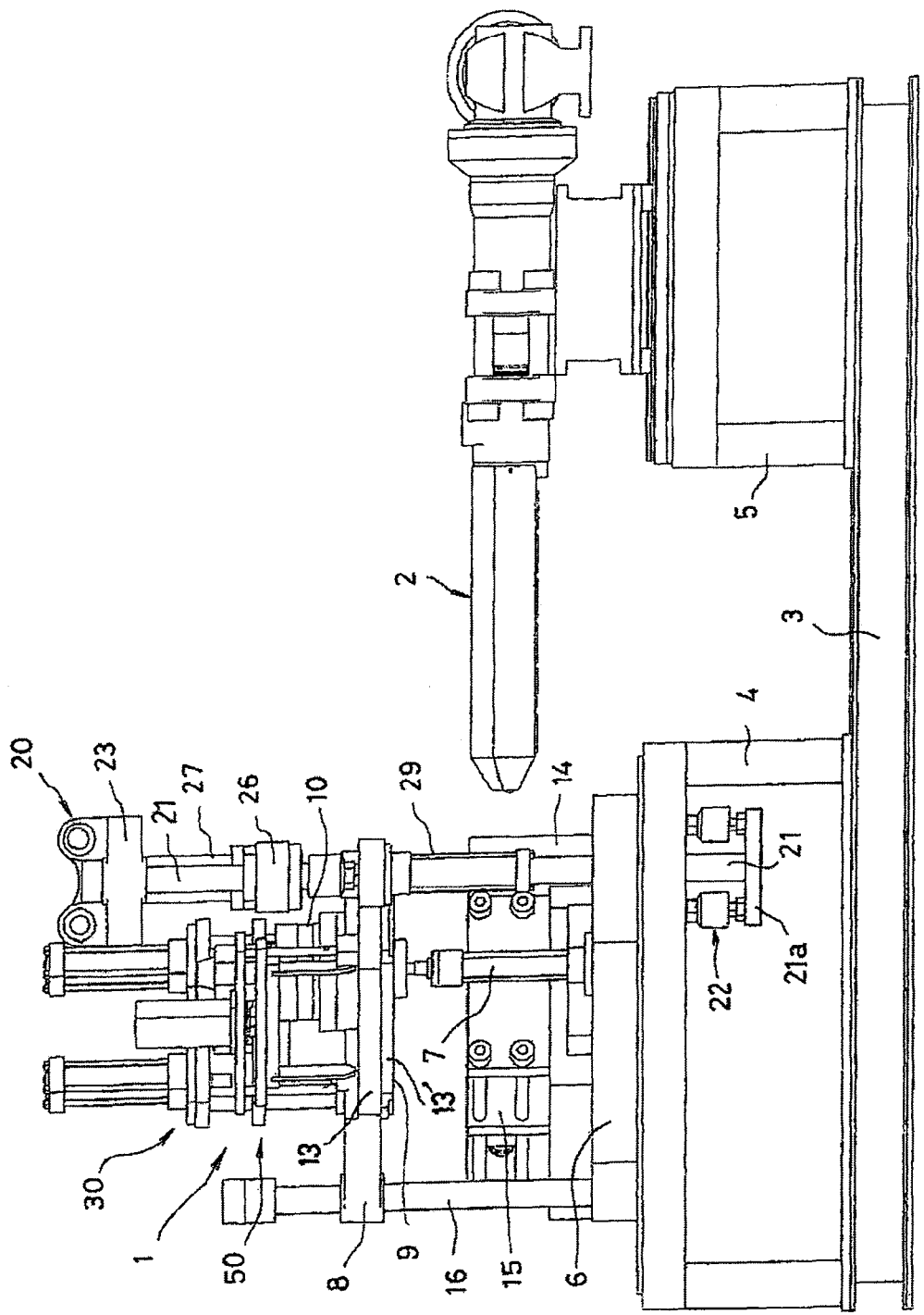
FIG. 1 is a side view of an injection/stretch blow molding machine according to an embodiment of the present invention.

In the drawings, the numeral 1 denotes an injection/stretch blow unit and numeral 2 denotes an injection unit. These are respectively installed on dedicated beds 4 and 5 for each having a frame structure. The beds 4 and 5 are dividedly placed and fixed onto a common base frame 3 while ensuring a predetermined work space therebetween.

Figure 2:
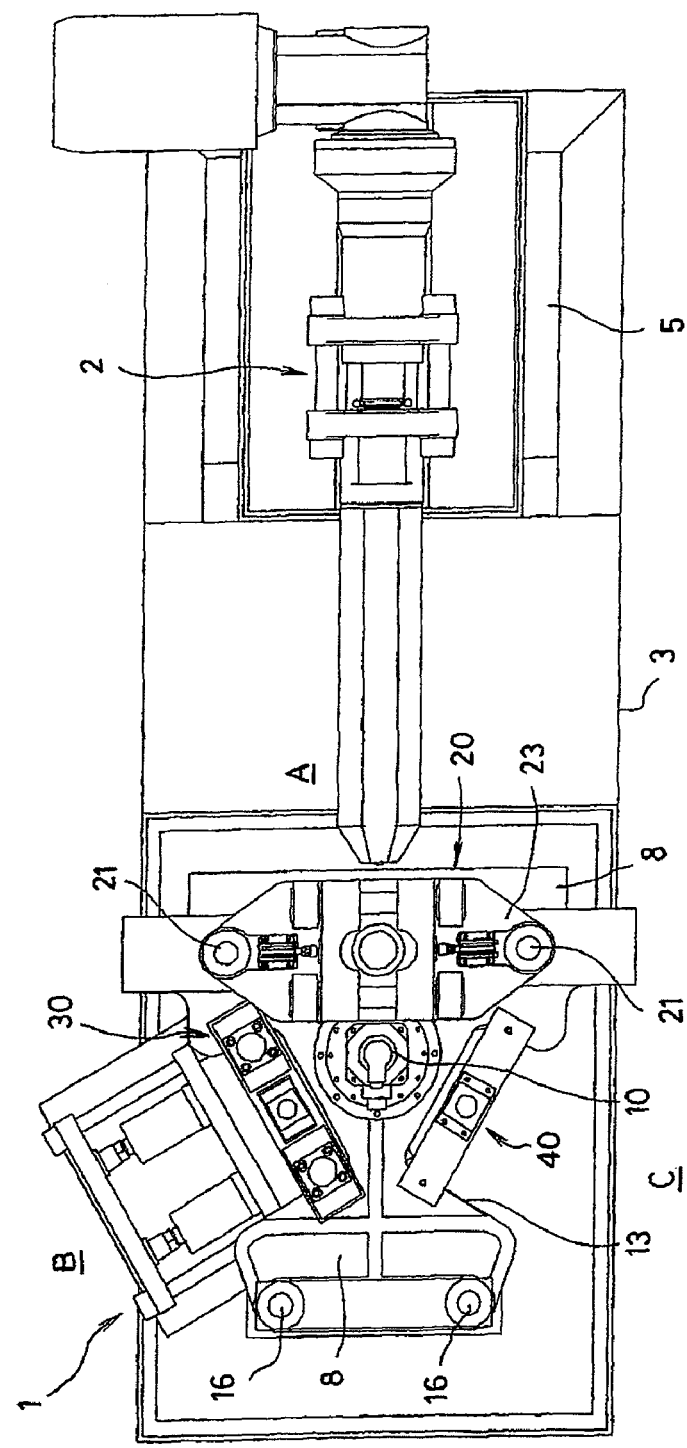
FIG. 2 is a plan view of the injection/stretch blow molding machine shown in FIG. 1.
Figure 3:
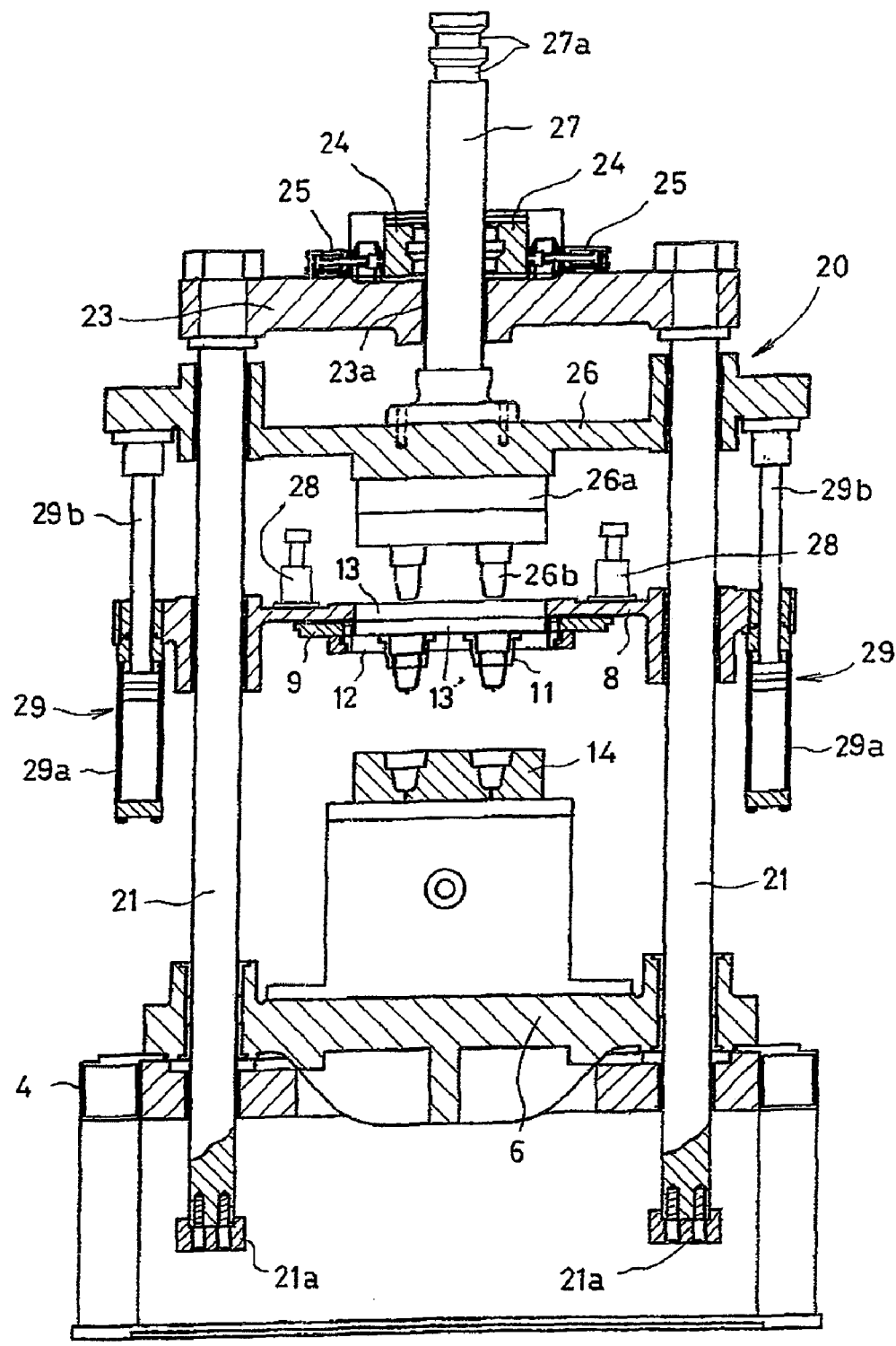
FIG. 3 is a front view in vertical section of an injection mold clamping mechanism in a mold open state.

The injection/stretch blow unit 1 includes a lower base platen 6 installed on the bed 4 and an upper base platen 8 supported horizontally above the lower base platen 6 by a hydraulic lift cylinder 7. A circular transfer platen 9 is attached to an underside of the upper base platen 8 and connected rotatably to a drive shaft of an electric motor 10 which is installed in the center of an upper surface of the upper base platen 8. The drive motor 10 is an AC servomotor adapted to rotate intermittently by 120 degrees. At a lower surface of an edge portion of the transfer platen 9, as shown in FIG. 3 et seq., a mold holding plate 12 comprising a pair of plates and provided with neck molds 11 is attached openably and closably in the radial direction of the transfer platen 9, while fitting in guide plates of which both ends are secured to the lower surface of the transfer platen. Positions at which the mold holding plate 12 stops in intermittent rotation of the electric motor 10 are set, as an injection operation section A, a stretch blow operation section B and a take-out operation section C, so that preform injection molding, stretch blow molding and taking out of hollow molded products can be performed in this order (see FIG. 2).

Edge sides of the portions of the upper base platen 8 corresponding to the operation sections A, B and C and edge portions of the transfer platen 9 to be stopped at the operation sections A, B and C are formed as U-shaped recesses 13 and 13'. The neck molds 11 are positioned in each of the recesses 13' of the transfer platen 9 together with the mold holding plate 12. In the recessed positions of the upper base platen 8 corresponding to the operation sections A, B and C, installed are vertical type mold clamping mechanism 20, stretch blowing mechanism 30 and take-out mechanism 40, respectively. In the injection operation section A and the stretch blow operation section B, installed are an injection mold 14 and a blow mold 15 respectively on the lower base platen 6.

On both sides of the injection operation section A, installed are a pair of mold clamping shafts 21 of the injection mold clamping mechanism 20. The mold clamping shafts 21 movably extends upright vertically through both lower base platen 6 and upper base platen 8. Between the stretch blow operation section B and the take-out operation section C, erected are a pair of support posts 16 on the lower base platen 6. The upper base platen 8 is movably supported vertically by the mold clamping shafts 21 and the support posts 16.

Figure 4:
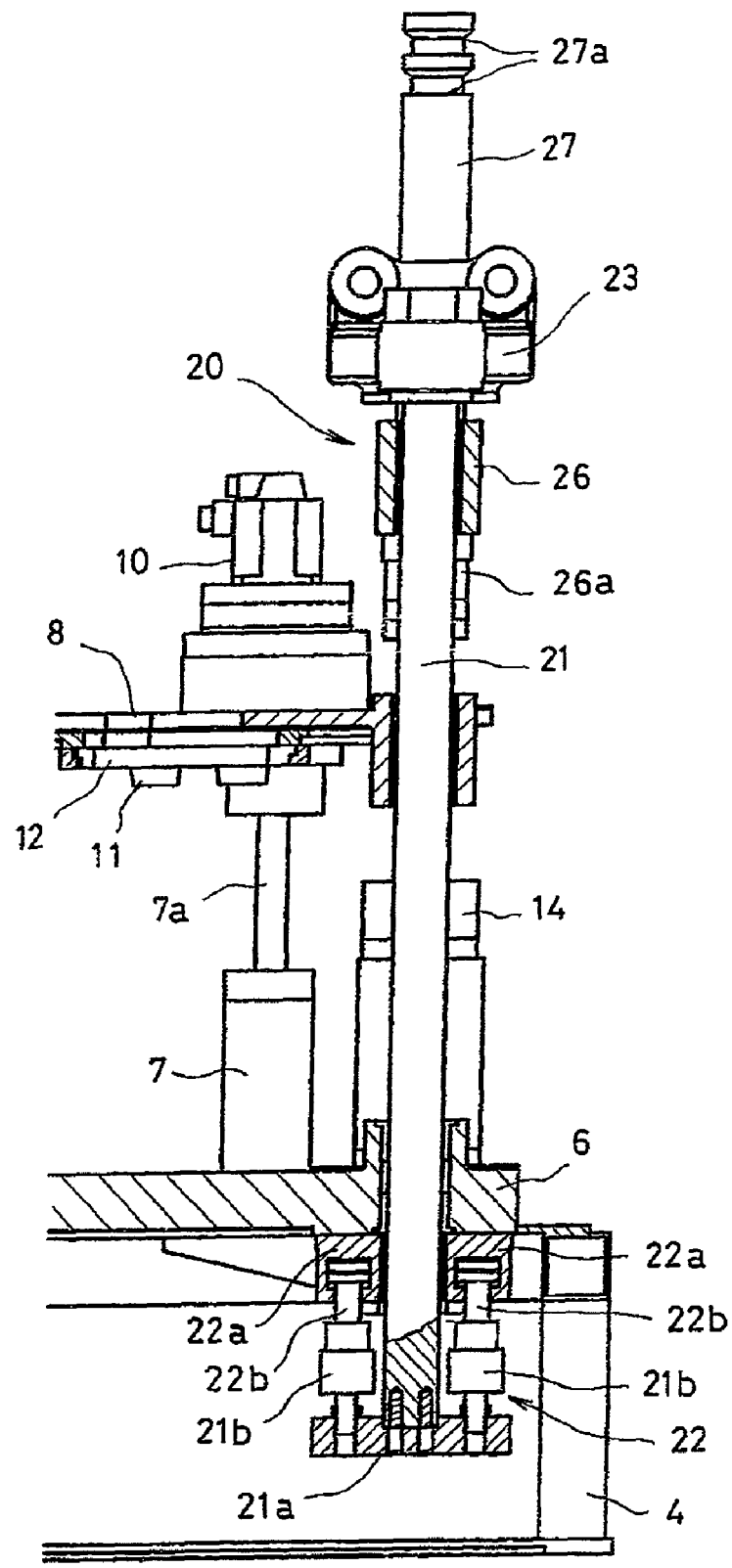
FIG. 4 is a side view in vertical section of the injection mold clamping mechanism in a mold open state.

As shown in FIG. 4, lower ends of the mold clamping shafts 21, which are projectingly positioned within the bed, are connected to plural hydraulic mold clamping means 22 which are attached to an underside of the lower base platen 6 for each shaft. The mold clamping means 22 are composed by connecting a front and rear pair of small-sized hydraulic cylinders 22a and a front and rear pair of small-sized rams 22b, which are attached to the lower base platen 6 on both sides of the shafts, through joints 21b to pressure bearing plates 21a secured to a lower end of the shafts. Hydraulic control for both oil chambers in the hydraulic cylinders 22a can be performed by means of a bidirectional pump disposed in a mold clamping hydraulic circuit. The bidirectional pump has the structure in which the supplying direction of pressure oil can be changed by forward-reverse rotation.

The mold clamping shafts 21 are integrally connected together through a top platen 23 mounted horizontally at upper ends of the shafts. The top platen 23 has a central opening 23a. On both sides of the central opening, a pair of right and left clamp members 24 using half nuts are disposed on the platen surface together with pneumatic clamp cylinders 25.

Between the upper base platen 8 and the top platen 23, a mold clamping platen 26 is fitted at both ends thereof on the mold clamping shafts 21 vertically movably. The mold clamping platen 26 is provided with, a mold clamping rod 27 in the center of its upper surface, and clamping grooves 27a for fitting the clamp members 24 therein from both sides are formed at multiple stages in the outer periphery of an upper end portion of the mold clamping rod 27. The mold clamping platen 26 is further provided with a mold clamping block 26a in the center of its lower surface, the mold clamping block 26a to which core molds 26b are attached downwards. The mold clamping block 26a has a size which can be received within the recess 13, 13' and pressing the mold holding plate 12 into pressure contact with an upper surface of the injection mold 14.

The mold clamping platen 26 and the upper base platen 8 are connected together through a pair of pneumatic mold opening/closing cylinders 29 installed at both side portions of the platens. In each of the mold opening/closing cylinders 29, a cylinder 29a is secured upwards to the upper base platen 8, while a piston rod 29b is connected to the mold clamping platen 26. The piston rods 29b at both side portions are extended and retracted by air purging in upper or lower chambers of the cylinders 29a and by high-pressure air supply, and thereby the mold opening/closing cylinders 29 move up and down at high speed with respect to the upper base platen 8. Plural shock absorbers 28 are erected on the upper surface of the upper base platen 8. The mold clamping platen 26 is borne by the shock absorbers 28 halfway of its descent and hence slows down, and thereby the shock in mold closing is reduced. Further, the resilience of the shock absorbers 28, coupled with the extending motion of the mold opening/closing cylinders 29 in mold opening, also acts as a mold opening force.

Figure 5:
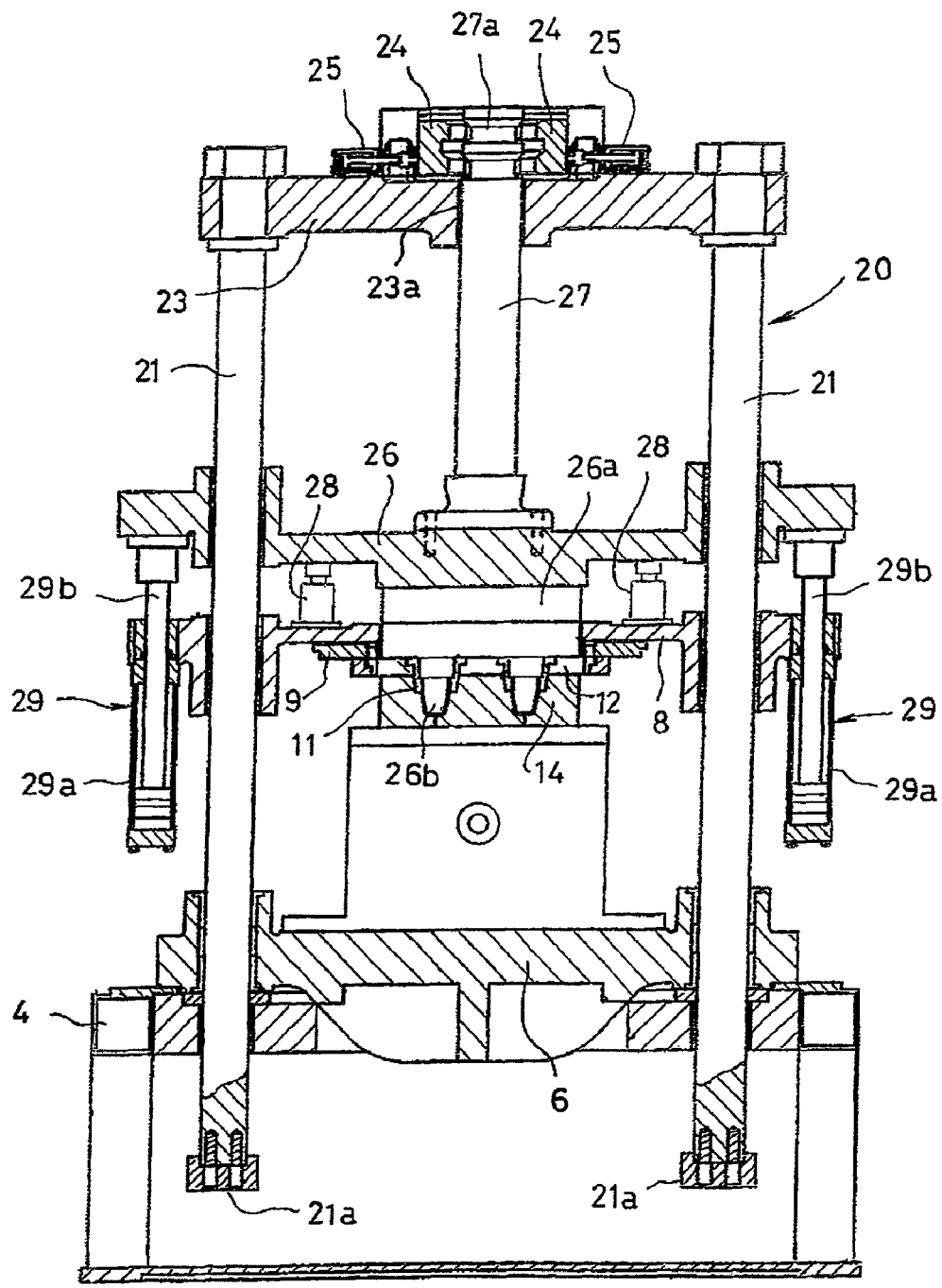
FIG. 5 is a front view in vertical section of the injection mold clamping mechanism in a mold closed state.

In the injection/stretch blow molding machine of the above construction, when the lift cylinder 7 operates hydraulically and hence its piston rod 7a is extended as shown in FIG. 3, the upper base platen 8 rises, and the neck molds 11 and the injection mold 14 open. On the other hand, when the piston rod 7a retracts, the upper base platen 8 descends, and the neck molds 11 and the injection mold 14 close, as shown in FIG. 5. The opening and closing of the neck molds 11 is performed simultaneously also with respect to the blow mold 15 in the stretch blow operation section B. Thus, the lift cylinder 7 also functions as a mold closing cylinder.

In the mold opening operation due to the rise of the upper base platen 8, since the upper base platen 8 and the mold clamping platen 26 are connected to the mold opening/closing cylinders 29, the clamp members 24 on the top platen 23 which clamp the mold clamping rod 27 during mold clamping are moved backward pneumatically by the clamp cylinders 25, allowing the mold clamping rod 27 of the mold clamping platen 26 to stand free. Further, supply destination of pressure oil in the mold clamping cylinders 22a of each mold clamping means 22 is switched from the upper chamber to the lower chamber, and the mold clamping shafts 21 are pushed back to the mold open position together with the top platen 23. As a result, the upper base platen 8 rises together with the mold clamping platen 26 without any trouble. An independent rise of the mold clamping platen 26 is performed by extending the piston rods 29a of the mold opening/closing cylinders 29 by means of high-pressure air.

The extension of the mold opening/closing cylinders 29 can be performed either simultaneously with or after the extension of the lift cylinder 7. In the simultaneous operation, a high-speed mold opening operation is attained, since both release of the neck molds 11 from the injection mold 14 along with rise of the upper base platen 8 and release of the core molds 26b from the neck molds 11 as well as from the preform along with rise of the mold clamping platen 2 are performed in the rising process. When the mold opening/closing cylinders 29 are operated for extension after the extending operation of the lift cylinder 7, the core molds 26b release from the injection mold 14 together with the neck molds 11 and the preform, followed by release of the core molds 26b along with rise of the mold clamping platen 26. This releasing operation can be performed optionally.

Upon retracting operation of the lift cylinder 7 in the mold open state shown in FIG. 3, both upper base platen 8 and mold clamping platen 26 descend to the point where the mold holding plate 12 installed on the lower surface of the transfer platen 9 on the underside of the upper base platen contacts an upper end surface of the injection mold 14 and stops. As a result, the neck molds 11 and the injection mold 14 close. Next, when the piston rods 29a are retracted by air purge in the lower chambers of the mold opening/closing cylinders 29, the mold clamping platen 26 descends to the point where the mold clamping block 26a contacts the mold holding plate 12 and stops after passing through the associated recess 13. In the course of this descent the mold clamping platen 26 is borne by the shock absorbers 28 and its descending motion slows down. As a result, even if the retracting motion of the mold opening/closing cylinders 29 by air purge is performed at a higher speed than in the case of using oil pressure, the core molds 26b are inserted slowly into cavities to close the mold as shown in FIG. 5. Also in this mold closing state, the lift cylinder 7 and the mold opening/closing cylinders 29 can be operated simultaneously.

Figure 6:
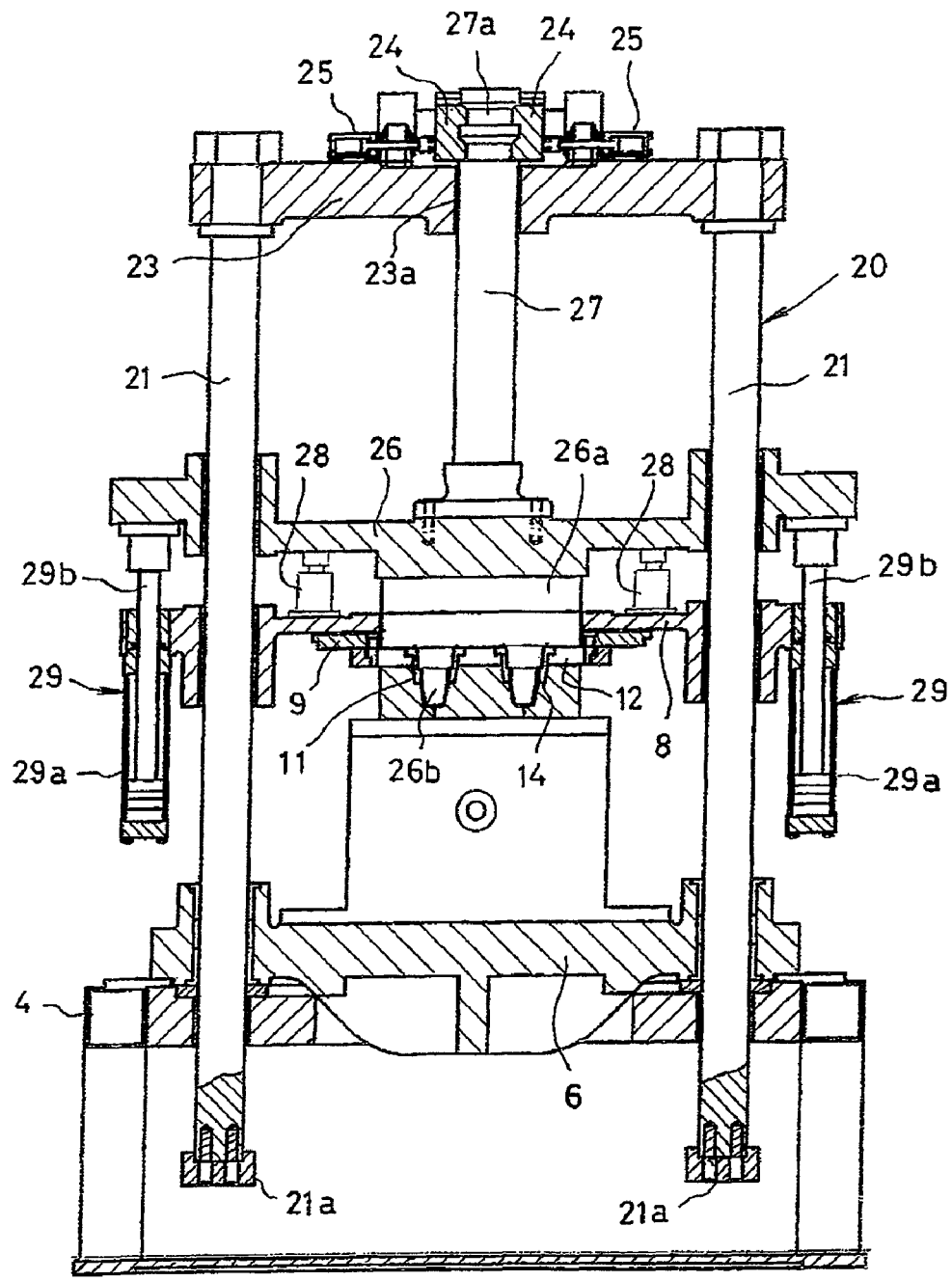
FIG. 6 is a front view in vertical section of the injection mold clamping mechanism in a mold clamping state.

If the clamp cylinders 25 are operated forward after the above closing of the mold, the clamp members 24 are fitted in the clamping grooves 27a of the clamping rod 27, and the mold clamping platen 26 is fixed to the top platen 23 through the mold clamping rod 27, as shown in FIG. 6. If the mold opening/closing cylinders 29 are pressure-intensified, both sides of the mold clamping platen are pressed down strongly. In this state, supply destination of pressure oil to the mold clamping cylinders 22a at the lower ends of the mold clamping shafts 21 is switched from the lower chamber to the upper chamber, and thereby the mold clamping shafts 21 are pressurized and pulled downward by the pressure bearing plate 21a. Since the top platen 23 to which the mold clamping rod 27 on the mold clamping platen 26 is fixed is connected to the upper end portions of the mold clamping shafts 21, the aforesaid pulling force is concentrated on the mold clamping rod 27, and thereby the mold is clamped strongly by the mold clamping platen 26.

For example, for replacement of the injection mold 14 or for maintenance of the injection mold clamping mechanism 20 in the injection operation section A, the injection unit 2 is turned sideways (not shown), and then the related work can be performed in standing posture or seating position on a work bench in the work space formed between the bed 4 of the injection/stretch blow unit 1 and the bed 5 of the injection unit 2 independent from each other. Since the beds 4 and 5 are constituted dividedly and independently, size of the beds is reduced. By changing the size of the base frame, it becomes possible to freely select a mold clamping mechanism and an injection unit having a mold clamping force and injection capacity suitable for a molded product to be obtained and thereby constitute a molding machine.

Figure 7:
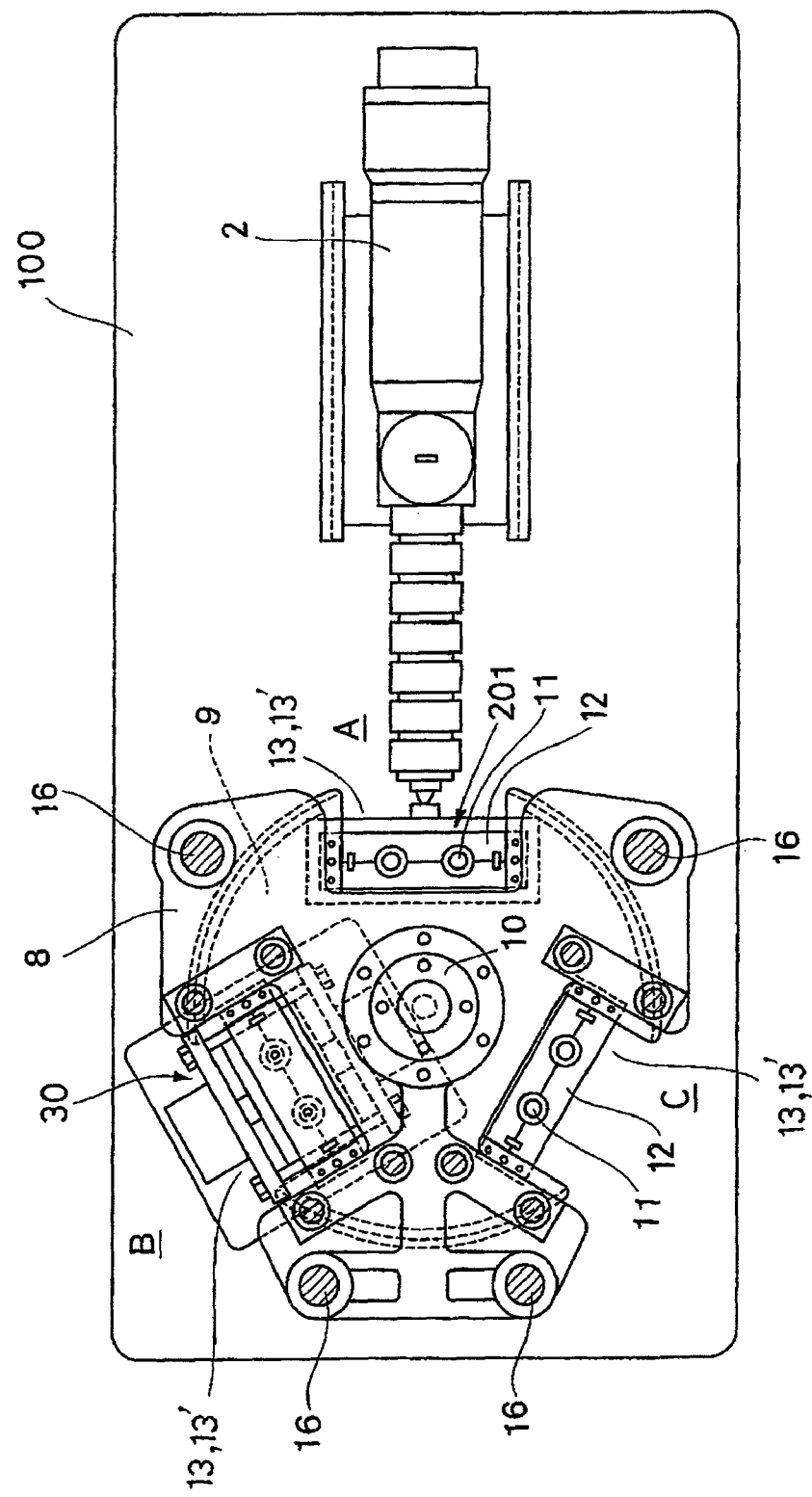
FIG. 7 is a schematic plan view of an injection/stretch blow molding machine according to another embodiment of the present invention, in which mechanisms installed on an upper base platen are omitted.
Figure 8:
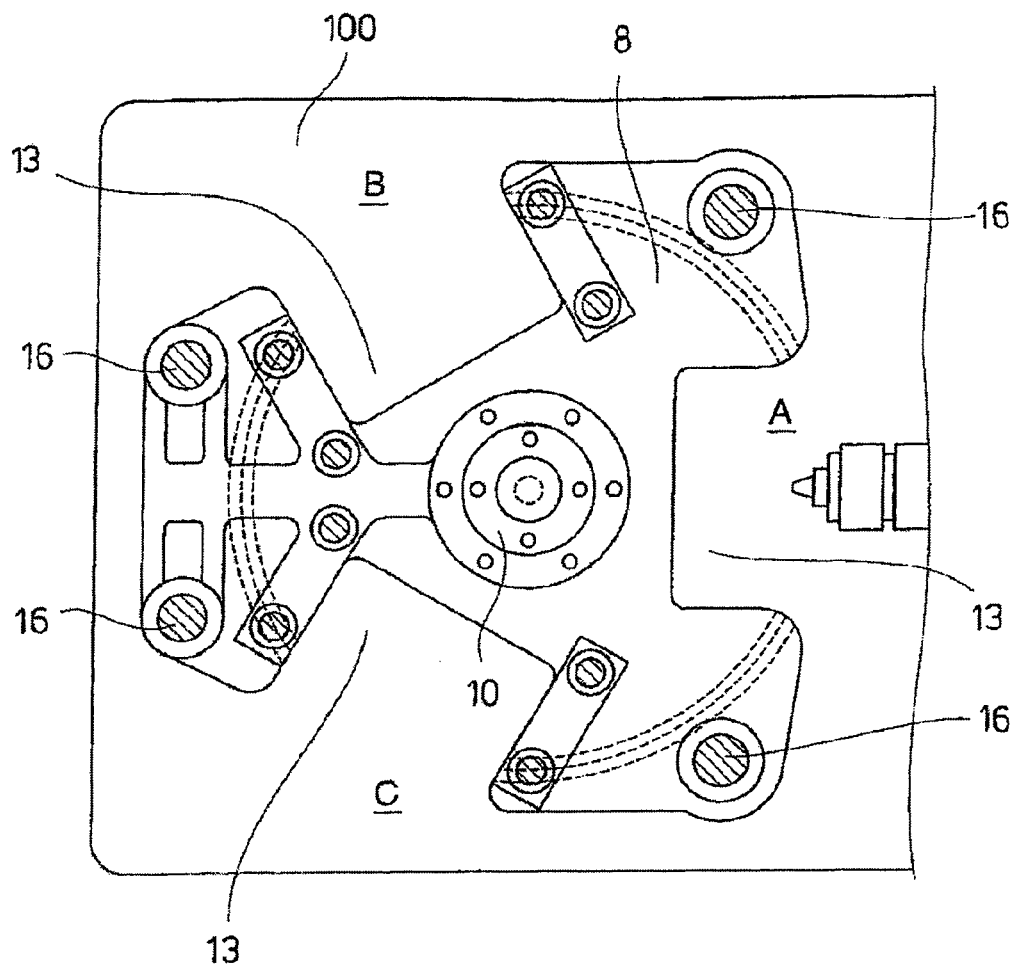
FIG. 8 is a plan view of the upper base platen and a transfer platen in the injection/stretch blow molding machine shown in FIG. 7.
Figure 8:
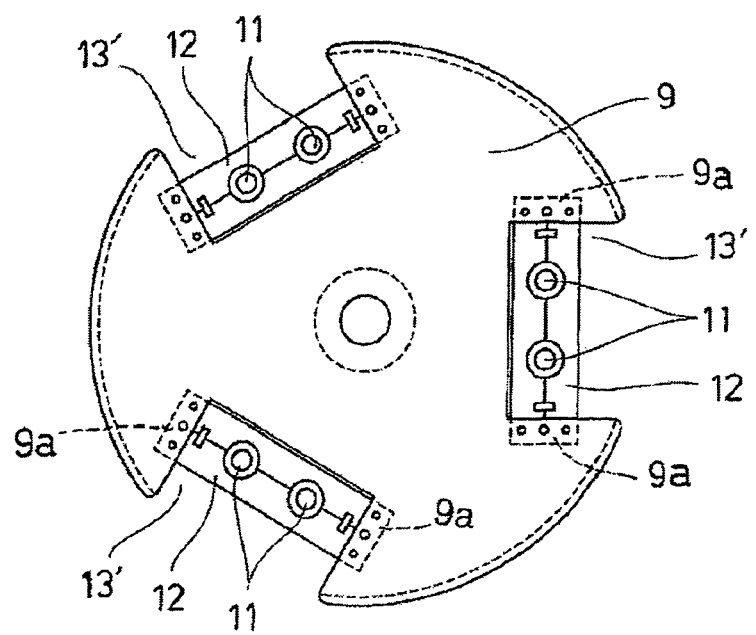

FIG. 7 et seq. illustrate an injection/stretch blow molding machine according to another embodiment of the present invention provided with an injection/stretch blow unit 1 wherein both upper base platen 8 and transfer platen 9 in operation sections A, B and C are formed in the above-described U-shaped recesses 13 and 13'.

The injection/stretch blow unit 1 and an injection unit 2 are installed on a common bed 100. The upper base platen 8 of the injection/stretch blow unit 1 is installed horizontally on the bed, so as to be movable vertically while being fitted at its peripheral edge portion on tie bars 16 which are erected at four positions on the bed. In the center of an upper surface of the upper base platen 8, installed is a drive motor 10 for rotating the transfer platen 9 intermittently counterclockwise by 120 degrees. Although not shown in the drawings, a driving shaft of the drive motor 10 extends through the center of the upper base platen and is connected to the center of the transfer platen 9. Moreover, a lift cylinder device of the upper base platen 8 similar to that of the molding machine disclosed in Japanese Patent No. 2832263 is connected to a motor casing.

Figure 10:
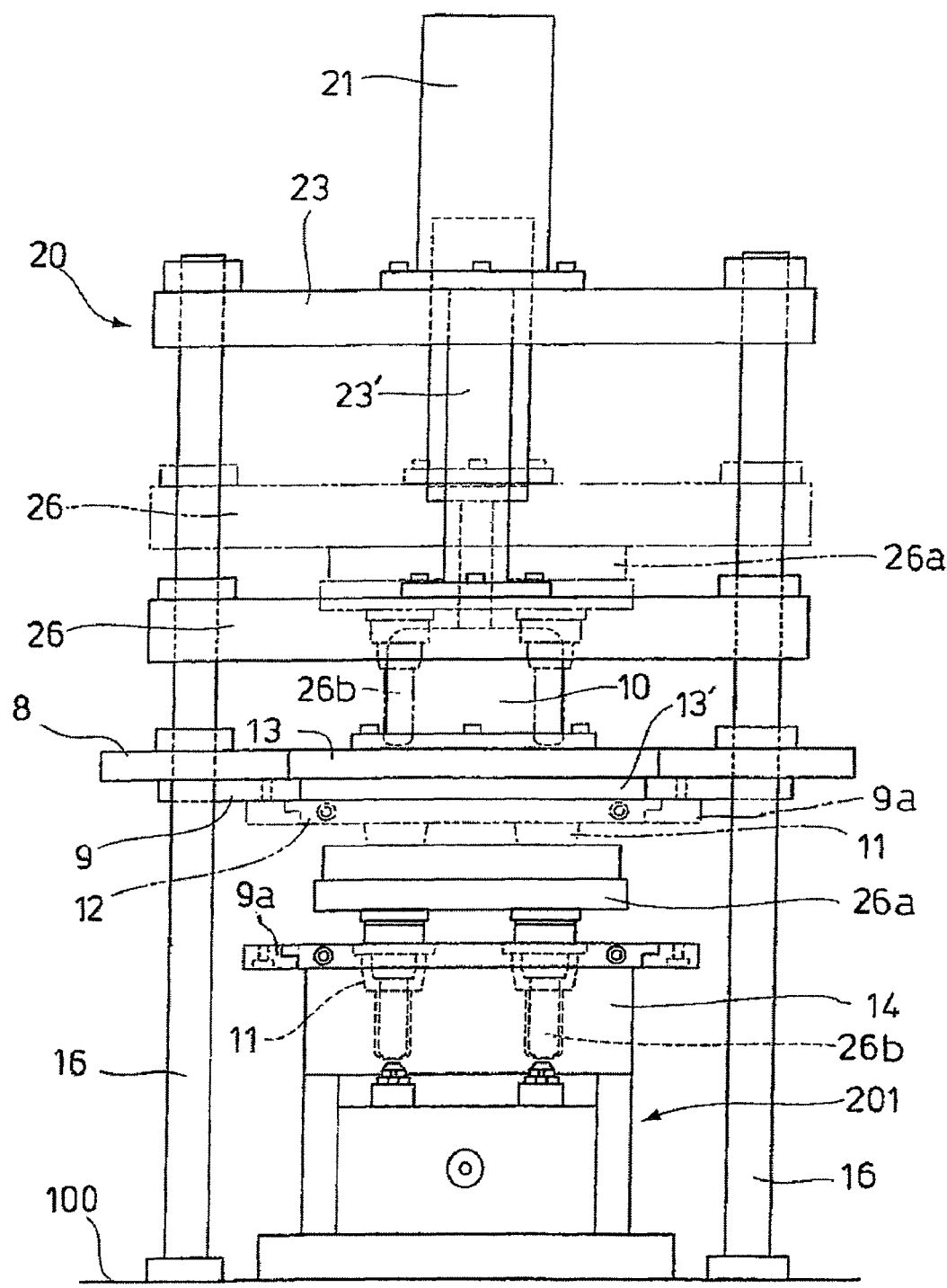
FIG. 10 is a front view of an injection molding operation section in assembling the injection mold assembly, and neck molds and injection core molds.
Figure 12:
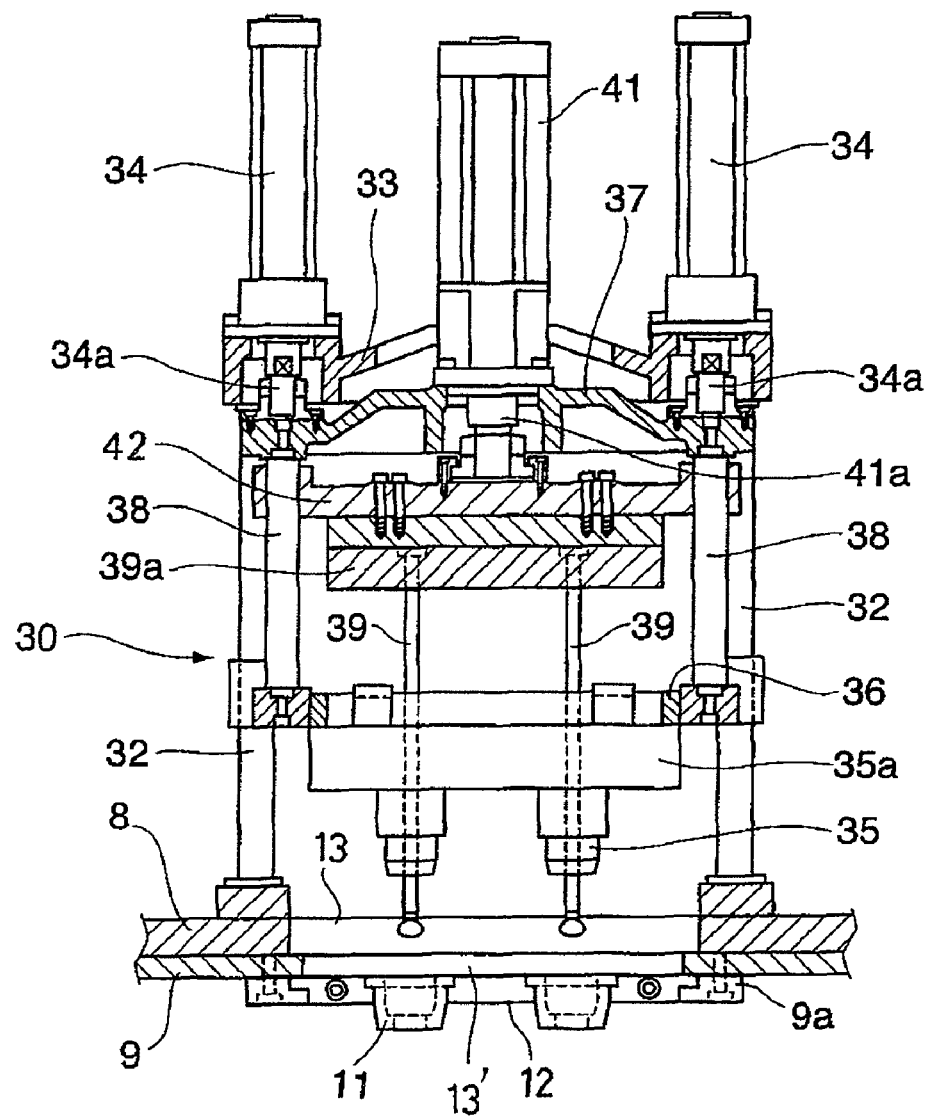
FIG. 12 is a front view in vertical section of a stretch blow molding operation section, showing a mold open state.
Figure 12:
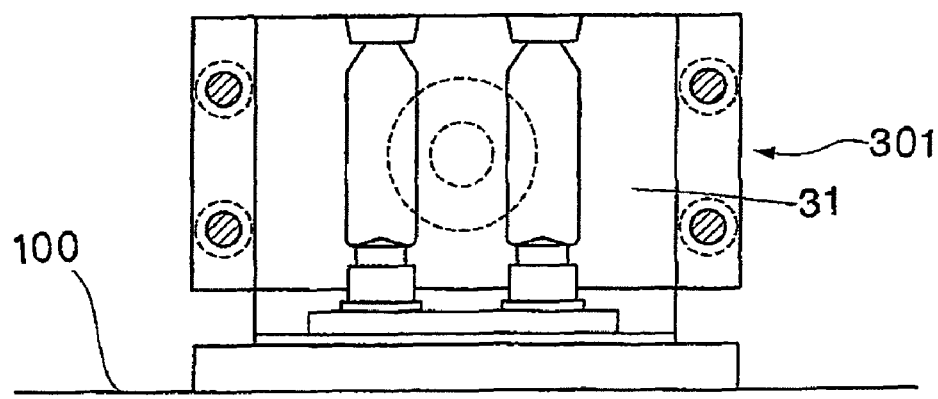

An injection mold clamping mechanism 20 shown in FIG. 10, a stretch blowing mechanism 30 shown in FIG. 12 and a product take-out mechanism (not shown) are installed in this order on the recesses 13 of the injection operation section A, the stretch blow operation section B and the take-out operation section C of the upper base platen 8. The recesses 13 and 13' are of a size permitting inserting therein the mold clamping block 26a of the core molds 26b in the injection mold clamping mechanism 20 or a mold clamping block 35a of blow cores 35 in a stretch blowing mechanism 30. Neck molds 11 are positioned in each recess 13' of the transfer platen 9 by a mold holding plate 12. The mold holding plate 12 is fitted and held at both ends with a pair of guide plates 9a secured to both sides of the recess, and is radially openable and closable with respect to the transfer platen 9. Injection molding for a preform, stretch blow molding and taking-out of the resulting hollow molded products can be performed continuously in this order at the points where the neck molds 11 stop.

An injection mold assembly 201 for a preform is installed on the bed of the injection molding operation section A, and a blow mold assembly 301 for the preform is installed on the bed of the stretch blow molding operation section B. The mold assemblies 201 and 301 are inserted into the work space from sideways of the bed and are fixed onto the bed which underlies the recesses.

As shown in FIG. 10, the injection mold clamping mechanism 20 comprises a mold clamping cylinder 21 installed in the center of a stationary platen 23 which is horizontally connected to upper ends of the tie bars 16 and a mold clamping platen 26 fit and supported on the tie bars 16 and connected to a piston rod 21' of the mold clamping cylinder 21. Core molds 26b are attached downwards to a lower surface of the mold clamping platen 26 while base ends thereof are fixed to a mold clamping block 26a. The core molds 26b have core base portions adapted to fit with the associated neck molds 11 upon mold closing and have length penetrating the neck molds 11 from the core base portions and reaching near the cavity bottom within the injection mold 14.

The stretch blowing mechanism 30 comprises four support posts 32 of which each pair erects on the right and left sides with respect to the associated recess 13 on the upper surface of the upper base platen, a frame-like stationary platen 33 mounted bridgewise on top of the support posts 32, a pair of pneumatic or hydraulic lift cylinders 34 mounted upwards over the support posts on both sides of the stationary platen, and a frame-like holding platen 36 for blow cores 35, the holding platen 36 being connected to piston rods 34a of the lift cylinders 34, and fitted and supported on the support posts 32 vertically movably.

The holding platen 36 and the piston rods 34a of the lift cylinders 34 are connected together through a movable platen 37 which is connected on both sides to the piston rods 34a and disposed under the stationary platen 33 and further through a pair of tie rods 38 attached to an underside of the stationary platen 33 at both side positions of the movable platen 37. A mounting platen 42 for stretching rods 39 is fitted and supported on the tie rods 38 vertically movably and is connected to a plunger 41a of a pneumatic extension drive 41 which is vertically installed in the center of the movable platen 37. The blow cores 35 provided in the same number as the number of cavities of a blow mold 31a are attached downwards to a mold clamping block 35a on a lower surface of the holding platen 36 as well as to the joint plate 39a on a lower surface of the mounting platen 42 in a state where the stretching rods 39 are inserted into the blow cores 35.

In the above construction, since edge sides of the portions of the upper base platen 2 corresponding to the operation sections A, B, C and edge sides of the portions of the transfer platen 4 to be stopped at those operation sections are formed in U-shaped recesses 13 and 13' of a size permitting insertion therein of the mold clamping blocks 26a and 35a, it is possible to superimpose the mold clamping blocks 26a and 35a on the molds of the injection mold assemblies 201 and the blow mold assemblies 301, and, in this state, to mount them to the mold clamping platen 26 of the injection mold clamping mechanism 20 and the holding platen 36 of the stretch blow mechanism 30.

Figure 9:
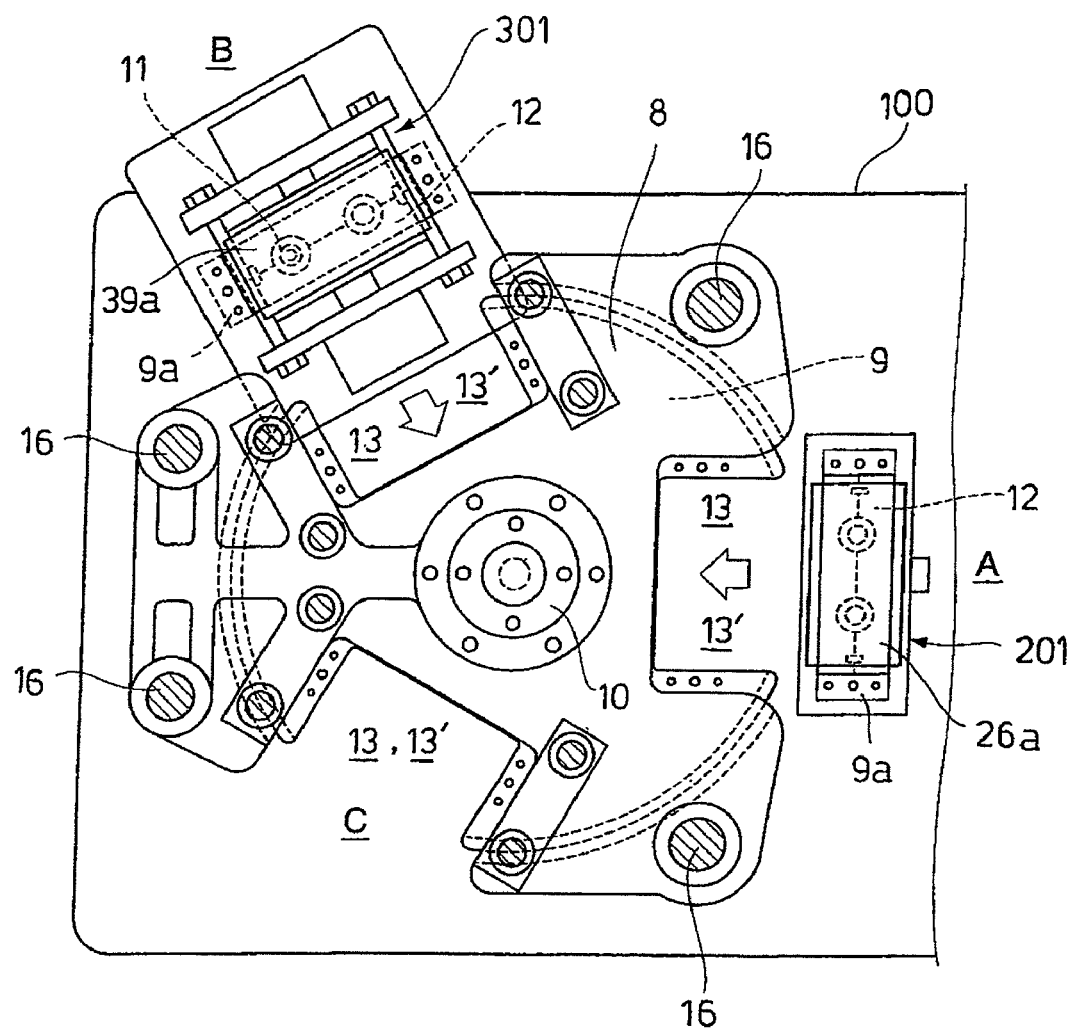
FIG. 9 is a plan view on the upper base platen side, showing a state where an injection mold assembly and a blow mold assembly are inserted.

Assembly in the injection molding operation section A is performed as indicated with solid lines in FIGS. 9 and 10. First, the mold holding plate 12 is superimposed on the injection mold 14 of the injection mold assembly 201 which is placed on the bed outside the upper base platen 8, and the neck molds 11 are fitted in cavities formed in an upper portion of the mold. The neck molds 11 are held in a mold closed state within the cavities of the injection mold 14.

Next, the core molds 26b are inserted from the neck molds 11 into the cavities formed in the injection mold and the mold clamping block 26a is superimposed on the mold holding plate 12. As a result, the neck molds 11 and the core molds 26b are superimposed on the injection mold 14 in a mold closed state. In this state the injection mold assembly 201 is pushed into the work space and installed on the bed just under recesses 13, 13'. In this case, it is preferable that the upper base platen 2 be moved upward to widen the work space.

After the installation of the injection mold assembly 201, though not shown in the drawings, the upper base platen 8 is moved down to the point where a lower surface of the transfer platen 9 comes into contact with the mold holding plate 12, then the mold holding plate 12 is mounted to the transfer platen 4 while guide plates 9a is secured to a lower surface of the transfer platen on both sides of the associated recess. Along with the descent of the upper base platen 8, the mold clamping block 26a is inserted into the recesses 13, 13' and then positioned from the recesses onto the base platen. Then, a piston rod 21a of the mold clamping cylinder 21 is extended, to cause the mold clamping platen 26 to descend to the point where the lower surface of the mold clamping platen 26 contacts an upper surface of the mold clamping block 26a, and then the mold clamping block 26a is secured to the lower surface of the mold clamping platen 26. Thereafter, the upper base platen 8 is raised up to a mold opening position by a lift cylinder mechanism (not shown) and the mold clamping platen 26 is raised up to a set height indicated with a chain line to complete the assembly. Along with such rising motions of the upper base platen 8 and the mold clamping platen 26, the core molds 25a leave the cavities of the injection mold 14 and are positioned over the recess 13 of the upper base platen 8.

Figure 11:
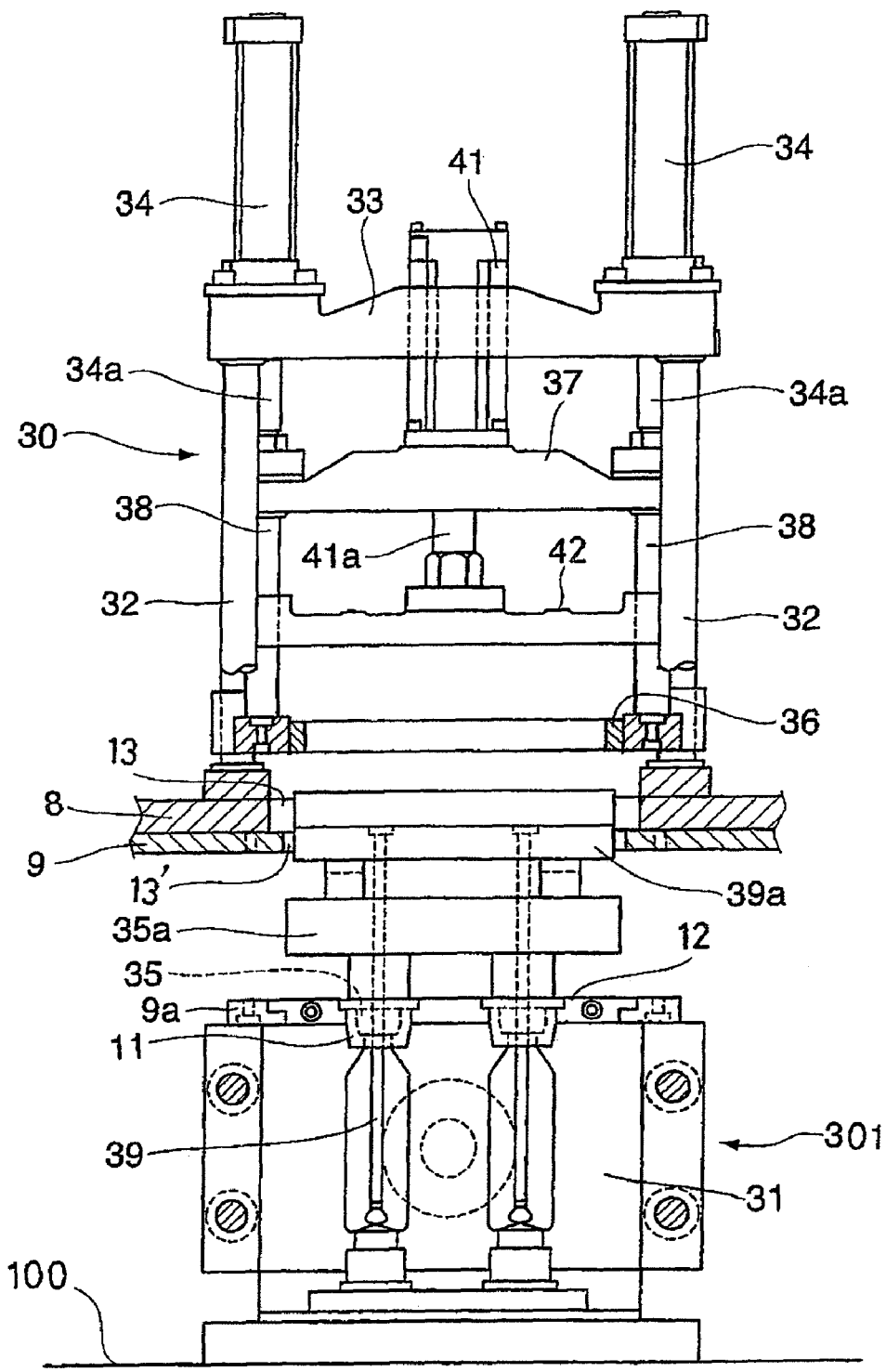
FIG. 11 is a front view of the injection molding operation section in assembling the blow mold assembly, and neck molds and blow cores.

Assembly in the stretch blow molding operation section B is performed in the following manner as shown in FIGS. 9 and 11. The mold holding plate 12 is superimposed on a blow mold 31 of the blow mold assembly 301 which is placed on the bed outside the upper platen 8, then the neck molds 11 are fitted with cavities formed in an upper portion of the mold, and thereby the neck molds 11 are held by the blow mold 31 in a mold closed state. Next, the mold clamping block 35a to which blow cores 35 are attached is superimposed on the mold holding plate 12 while the blow cores 35 are inserted from the neck molds 8 into cavities formed within the mold, and thereby the neck molds 11 and the blow cores 35 are superimposed on the blow mold 31 in a mold closed state.

Further, the joint plate 39a to which the stretching rods 39 are attached is superimposed on the mold clamping block 35a, while the stretching rods 39 are inserted from the mold clamping block 35a to the bottoms of the cavities through blow cores. In this state, the blow mold assembly 301 is pushed into the work space and installed on the bed just under the associated recesses 13, 13'. The mold clamping block 35a and the joint plate 39a may be superimposed one on the other, and in this state the mold clamping block 35a may be put on the blow mold 31.

After the installation of the blow mold assembly 301, though not shown, the upper base platen 8 descends to the point where the lower surface of the transfer platen 9 contacts the mold holding plate 12, and then the mold holding plate 12 is mounted to the transfer platen 9 while guide plates 9a are secured to a lower surface of the transfer platen on both sides of the recesses. Along with this descent of the upper base platen 8, the mold clamping block 35a and the joint plate 39a are inserted into the recesses 13, 13', being positioned from the recesses 13, 13' onto the base platen. Next, the piston rods 34a of the lift cylinders 34 are extended to cause the holding platen 36 to descend to the point where the lower surface thereof contacts the mold clamping block 35a, and the mold clamping block 35a is attached to the lower surface of the holding platen 36.

Further, with the descent of the holding platen 36, the joint plate 39a of the stretching rods 39 are positioned on the holding platen. Therefore, the plunger 41a of the extension drive 41 is extended to cause the movable platen 42 to descend to the point where its lower surface contacts an upper surface of the joint plate 39a, and the joint plate 39a is attached to the lower surface of the movable platen 42. Thereafter, the upper base platen, holding platen 36 and movable platen 42 are raised up to respective set heights shown in FIG. 12. Along with this ascent of the upper base platen 8, holding platen 36 and movable platen 42, the blow cores 35 leave the cavities of the injection mold 14 and are positioned over the recess 13 of the upper base platen 8. Further, the stretching rods 39 are retracted to lower end faces of the blow cores 35 to complete the assembly.

As described above, since edge sides of the portions of the upper base platen 8 corresponding to the operation sections A, B, C and edge sides of the portions of the transfer platen 8 to be stopped at operation sections thereof are formed as recesses 13 and 13' permitting insertion therein of the mold clamping platens 26 and 35a, mounting of the core molds 25a in the injection mold clamping mechanism 20 and of the blow cores 35 and stretching rods 39 in the stretch blowing mechanism 30 can be performed in a mold closed state simultaneously with the installation of the injection mold assembly 201 or the blow mold assembly 301. Consequently, the time required for mold assembling work is reduced, adjustment for positioning can be easily performed, and thereby the mold assembling work is completed in a shorter time, compared to the case where the mold is divided into upper part and lower part interposing the upper base platen 8 as a boundary and installation and mounting work have to be performed for each part.

INDUSTRIAL APPLICABILITY

The present invention allows, as set forth above, reduction in height and speed-up of opening and closing motions of the mold clamping mechanism, reduction in size of the mold clamping cylinder and speed-up of the mold assembling work. Thus, the present invention is extremely useful for an injection/stretch blow molding machine wherein molding operations including injection molding of a preform and stretch blow molding of a hollow molded product such as a bottle are performed in a continuous manner within single machine

What is claimed is:

1. In an injection/stretch blow molding machine comprising an injection/stretch blow unit and an injection unit, the injection/stretch blow unit including a lower base platen installed on a bed, an upper base platen supported vertically movably by a hydraulic lift cylinder, a space being formed between the lower base platen and the upper base platen and used as a work space, a transfer platen installed on an underside of the upper base platen so as to be rotatable intermittently, and a vertical injection mold clamping mechanism installed in an injection molding operation section, the injection molding operation section being defined at a stop position of neck molds provided on a lower surface of the transfer platen, the injection unit being installed on the bed toward the injection mold clamping mechanism, the injection/stretch blow molding machine improved in that the injection mold clamping mechanism comprising:

a pair of mold clamping shafts erected vertically movably on both sides of the injection molding operation section and extending through both the lower base platen and the upper base platen, upper end portions of the mold clamping shafts being connected together through a top platen;

a plurality of hydraulic mold clamping means connected respectively to lower ends positioned within the bed of the mold clamping shafts, the mold clamping shafts being attached to an underside of the lower base platen;

a mold clamping platen having, in the center of a lower surface thereof, a mold clamping block to which core molds are attached downwards, the mold clamping platen being fitted and supported at both end portions thereof on the mold clamping shafts and installed vertically movably between the upper base platen and the top platen;

a pair of mold opening/closing cylinders connecting, on both sides thereof, the upper base platen and the mold clamping platen with each other and causing the mold clamping platen to move vertically with respect to the upper base platen;

a mold clamping rod connected to the center of an upper surface of the mold clamping platen through a central opening of the top platen; and a pair of clamp members disposed on both sides of the opening in the upper surface of the top platen so as to be movable forward and backward, the clamp members being adapted to be engaged with the mold clamping rod by pneumatic clamp cylinders to connect the mold clamping platen and the mold clamping shafts with each other.

2. An injection/stretch blow molding machine according to claim 1, wherein the upper base platen is provided with, on an upper surface thereof, a plurality of shock absorbers for bearing the mold clamping platen.

3. An injection/stretch blow molding machine according to claim 1, wherein the mold clamping means each comprise a pair of front and rear hydraulic cylinders attached to the lower base platen on both sides of each of the mold clamping shafts and joints for connecting rams of the hydraulic cylinders with a pressure bearing plate secured to a lower end of the shaft.

4. An injection/stretch blow molding machine according to claim 1, wherein the bed is divided into a bed for the injection/stretch blow unit and a bed for the injection unit, and both of the beds are placed and fixed onto a common base frame so as to ensure a predetermined work space.

5. In an injection/stretch blow molding machine comprising an upper base platen installed horizontally above a bed, a space being formed between the upper base platen and the bed and used as a work space, a transfer platen installed rotatably on an underside of the upper base platen, a mold holding plate having neck molds and installed on a lower surface of the transfer platen openably and closably, the mold holding plate being adapted to stop at positions defined as an injection molding operation section, a stretch blow molding operation section and a take-out operation section, and provided with various devices being arranged on the bed and on the upper base platen, the injection/stretch blow molding machine improved in that edge sides of the portions of the upper base platen corresponding to the operation sections and edge sides of the portions of the transfer platen to be stopped at the operation sections are each formed as a U-shaped recess of a size permitting insertion therein of a joint plate of injection cores or blow cores disposed on the upper base platen, and in each of the recesses formed in the transfer platen the mold holding plate spans a lower surface of the recesses so as to cover both sides of the lower surface, thereby causing the neck molds to be positioned within the recess.

6. An injection/stretch blow molding machine according to claim 5, wherein the upper base platen is fitted vertically movably at a peripheral edge portion of the platen on tie bars erected at plural positions on the bed and is provided with a drive motor for rotating the transfer platen intermittently in the center of an upper surface thereof, the drive motor having a drive shaft extending through the center of the upper base platen and being connected to the center of the transfer platen.

7. An injection/stretch blow molding machine according to claim 2, wherein the bed is divided into a bed for the injection/stretch blow unit and a bed for the injection unit, and both of the beds are placed and fixed onto a common base frame so as to ensure a predetermined work space.

8. An injection/stretch blow molding machine according to claim 3, wherein the bed is divided into a bed for the injection/stretch blow unit and a bed for the injection unit, and both of the beds are placed and fixed onto a common base frame so as to ensure a predetermined work space.

* * * * *